United States Patent
Kim

(10) Patent No.: US 12,437,755 B2
(45) Date of Patent: Oct. 7, 2025

(54) METHOD FOR PROCESSING DIALOGUE AND DIALOGUE SYSTEM

(71) Applicants: Hyundai Motor Company, Seoul (KR); Kia Corporation, Seoul (KR)

(72) Inventor: Ji Hoon Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 18/132,630

(22) Filed: Apr. 10, 2023

(65) Prior Publication Data

US 2023/0335120 A1      Oct. 19, 2023

(30) Foreign Application Priority Data

Apr. 13, 2022  (KR) .................. 10-2022-0045893

(51) Int. Cl.
*G10L 15/22*      (2006.01)
*G10L 15/18*      (2013.01)
*G10L 15/30*      (2013.01)

(52) U.S. Cl.
CPC .......... *G10L 15/1815* (2013.01); *G10L 15/22* (2013.01); *G10L 15/30* (2013.01); *G10L 2015/223* (2013.01)

(58) Field of Classification Search
CPC ... G10L 15/22; G10L 15/30; G10L 2015/223; G10L 15/1822; G10L 15/04; G10L 15/063; G06F 40/295; G06F 40/35; G06F 40/211; G06F 40/30

USPC ......................................................... 704/257
See application file for complete search history.

(56) References Cited

U.S. PATENT DOCUMENTS

| | | | | |
|---|---|---|---|---|
| 11,308,962 B2* | 4/2022 | Smith | ..................... | G10L 15/30 |
| 11,482,224 B2* | 10/2022 | Smith | ................... | G10L 15/083 |
| 12,119,000 B2* | 10/2024 | Smith | ..................... | G06F 3/165 |
| 2015/0142704 A1* | 5/2015 | London | ............... | G10L 15/1822 |
| | | | | 706/11 |
| 2017/0206064 A1* | 7/2017 | Breazeal | ................... | G06F 8/36 |
| 2021/0149627 A1* | 5/2021 | Jang | ....................... | G06F 3/167 |
| 2021/0182111 A1* | 6/2021 | Jakobsson | ............ | G06F 9/5055 |
| 2022/0129556 A1* | 4/2022 | Chen | ........................ | G06F 21/74 |
| 2022/0199079 A1* | 6/2022 | Hanson | .................... | H04L 51/02 |
| 2023/0245654 A1* | 8/2023 | Shrivastava | ........ | G10L 15/1822 |
| | | | | 704/243 |
| 2023/0335120 A1* | 10/2023 | Kim | .................... | G10L 15/1822 |

* cited by examiner

*Primary Examiner* — Vijay B Chawan
(74) *Attorney, Agent, or Firm* — Morgan Lewis & Bockius LLP

(57) ABSTRACT

A dialogue processing method includes obtaining an intent classification result for a voice command of a user using a trained intent classification model, obtaining utterance history information of the user, and adjusting the intent classification result based on the utterance history information of the user, wherein the intent classification result includes a score of each of predetermined intents, and the adjusting of the intent classification result includes adjusting the score of each of the predetermined intents based on the utterance history information of the user.

16 Claims, 15 Drawing Sheets

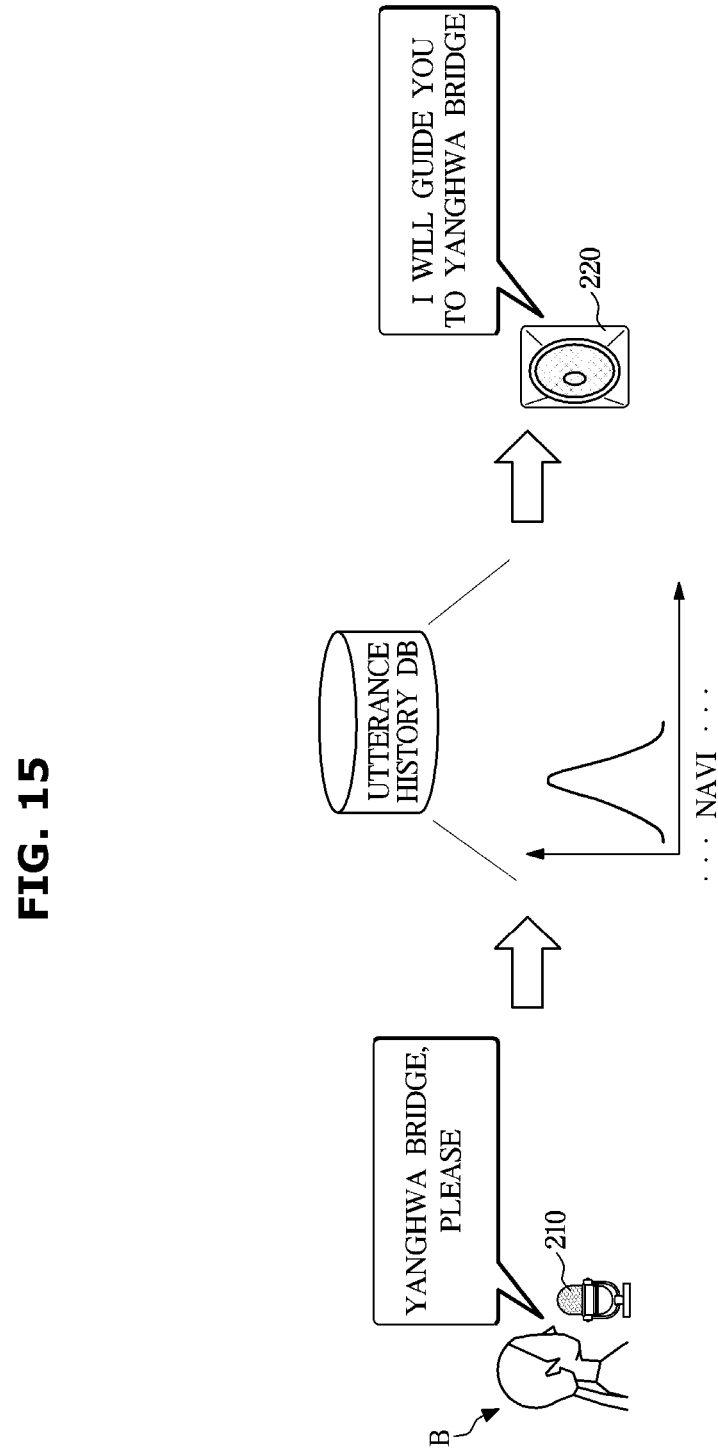

METHOD FOR PROCESSING DIALOGUE AND DIALOGUE SYSTEM

CROSS-REFERENCE TO RELATED APPLICATION

The present application claims priority to Korean Patent Application No. 10-2022-0045893, filed on Apr. 13, 2022, the entire contents of which is incorporated herein for all purposes by this reference.

BACKGROUND OF THE PRESENT DISCLOSURE

Field of the Present Disclosure

The present disclosure relates to a dialogue processing method and a dialogue system configured for grasping a user's intent through a dialogue with the user.

Description of Related Art

A dialogue system is a device capable of identifying a user's intent through a dialogue with the user. Such a dialogue system is connected to various electronic devices used in daily life, such as a vehicle, a mobile device, a home appliance, etc., to enable various functions corresponding to the user's utterance to be performed.

For the dialogue system to recognize the intent from the user's utterance, the dialogue system must process the user's utterance made in a natural language. The natural language refers to a language that humans use for communication in daily life, and is a concept in contrast to an artificial language (or constructed language) such as a computer programming language.

For the dialogue system to process the user's utterance made in the natural language, a natural language understanding (NLU) technique may be applied. Furthermore, recently, models trained by machine learning or deep learning may be used to implement the NLU technology.

Meanwhile, when a domain or an intent for a user' utterance is classified using the trained model and a slot is tagged, the result may be biased according to training data. Accordingly, a case in which a result different from the user's actual intent is output may occur.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a dialogue processing method and a dialogue management system which may adjust an output of an intent classification model based on an utterance history for each user, minimizing the output of results different from the user's actual intent because the intent classification result for the user's utterance is biased toward training data.

Additional aspects of the present disclosure will be set forth in part in the description which follows, and in part, will be obvious from the description, or may be learned by practice of the present disclosure.

In accordance with one aspect of the present disclosure, a dialogue processing method includes obtaining an intent classification result for a voice command of a user using a trained intent classification model; obtaining utterance history information of the user; and adjusting the intent classification result based on the utterance history information of the user, wherein the intent classification result includes a score of each of predetermined intents, and the adjusting of the intent classification result includes adjusting the score of each of the predetermined intents based on the utterance history information of the user.

The utterance history information of the user may include information on a frequency of an intent used by the user through utterance of the voice command.

The adjusting of the intent classification result may include adjusting an intent with a higher frequency of use by the user through the voice command to have a higher score, among the plurality of predetermined intents.

The adjusting of the intent classification result may include redetermining the scores by assigning a high weight to a score of an intent with a high frequency of use by the user through utterance of the voice command, among the plurality of predetermined intents.

The adjusting of the intent classification result may include decreasing a score which is less than a threshold and increasing a score of an intent with a high frequency of use by the user through utterance of the voice command, among the scores of the plurality of predetermined intents.

An amount of the decreasing in the score which is less than the threshold and an amount of the increasing in the score of the intent with the high frequency of use by the user through utterance of the voice command may be proportional to each other.

The utterance history information of the user may further include at least one of information on an utterance time of the user's voice command or an utterance location of the user's voice command.

The adjusting of the intent classification result may include redetermining the scores by assigning a high weight to a score of an intent with a high frequency of use at the utterance time or in the utterance location matching a current utterance time or a current utterance location, among the plurality of predetermined intents.

The adjusting of the intent classification result may include determining an intent having the highest score among the adjusted scores to be a final intent for the voice command of the user, and performing slot tagging on the voice command of the user based on the final intent.

The dialogue processing method may further include generating a system response based on the adjusted intent classification result; and transmitting the generated system response to the user terminal.

In accordance with another aspect of the present disclosure, there is a computer-readable recording medium in which a program for executing a dialogue processing method according to an exemplary embodiment of the present disclosure is recorded, the dialogue processing method includes obtaining an intent classification result for a voice command of a user using a trained intent classification model; obtaining utterance history information of the user; and adjusting the intent classification result based on the utterance history information of the user, wherein the intent classification result may include a score of each of predetermined intents, and the adjusting of the intent classification result includes adjusting the score of each of the predetermined intents based on the utterance history information of the user.

The utterance history information of the user may include information on a frequency of an intent used by the user through utterance of the voice command.

The adjusting of the intent classification result may include adjusting an intent with a higher frequency of use by the user through the voice command to have a higher score, among the plurality of predetermined intents.

The adjusting of the intent classification result may include redetermining the scores by assigning a high weight to a score of an intent with a high frequency of use by the user through utterance of the voice command, among the plurality of predetermined intents.

The adjusting of the intent classification result may include decreasing a score which is less than a threshold and increasing a score of an intent with a high frequency of use by the user through utterance of the voice command, among the scores of the plurality of predetermined intents.

An amount of the decreasing in the score which is less than the threshold and an amount of the increasing in the score of the intent with the high frequency of use by the user through utterance of the voice command may be proportional to each other.

The utterance history information of the user may further include at least one of information on an utterance time of the user's voice command or an utterance location of the user's voice command.

The adjusting of the intent classification result may include redetermining the scores by assigning a high weight to a score of an intent with a high frequency of use at the utterance time or in the utterance location matching a current utterance time or a current utterance location, among the plurality of predetermined intents.

The adjusting of the intent classification result may include determining an intent having the highest score among the adjusted scores to be a final intent for the voice command of the user, and performing slot tagging on the voice command of the user based on the final intent.

The dialogue processing method may further include generating a system response based on the adjusted intent classification result; and transmitting the generated system response to the user terminal.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 14, and FIG. 15 are diagrams illustrating examples of intent classification results output by a dialogue system and a dialogue processing method according to an exemplary embodiment of the present disclosure.

Figure 1:
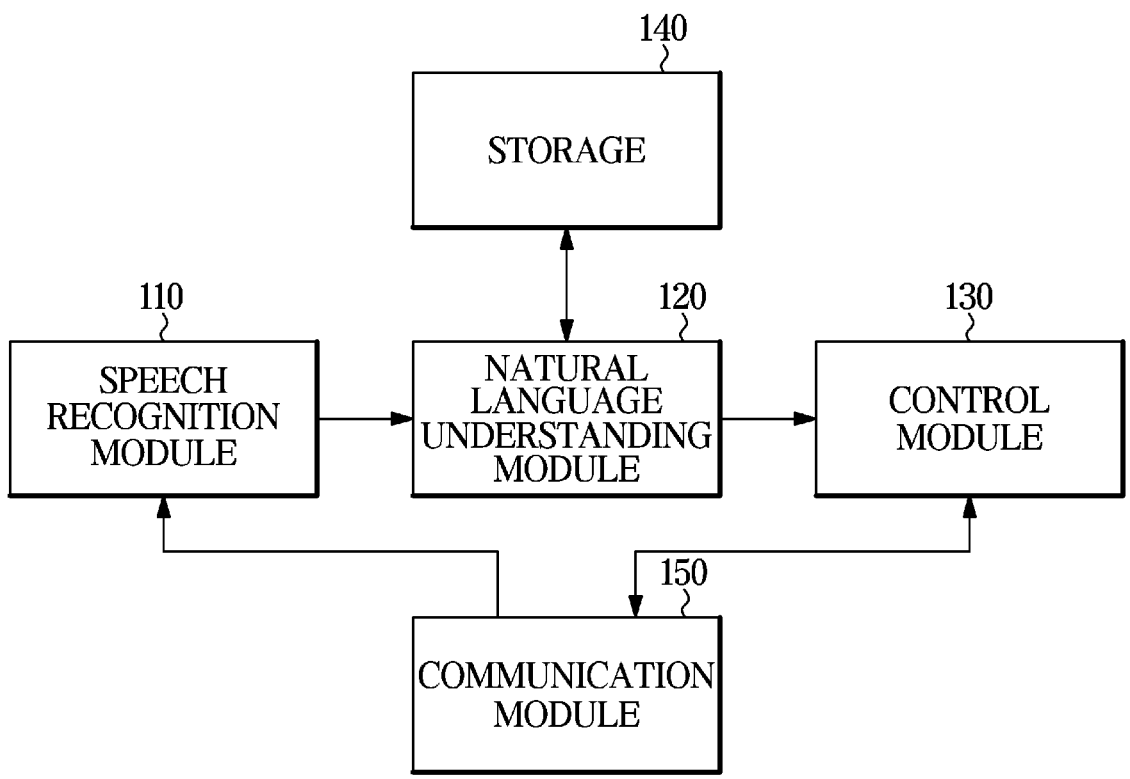
FIG. 1 is a block diagram illustrating an operation of a dialogue system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The configurations shown in the exemplary embodiments and drawings described in the present specification are exemplary examples of the included disclosure, and there may be various modifications that can replace the exemplary embodiments and drawings of the present specification at the time of filing of the present application.

Furthermore, the same reference numbers or symbols provided in each drawing of the present specification denote parts or components that perform substantially the same function.

Furthermore, the terms used in the present specification are used to describe examples, and are not intended to limit the present disclosure. Singular expressions include plural expressions unless the context clearly indicates otherwise. In the present specification terms such as "include" or "have" are intended to indicate the presence of a feature, number, step, operation, component, part, or combination thereof described in the specification, but do not preclude the possibility of the presence or addition of other features, numbers, steps, operations, components, parts or combinations thereof.

Furthermore, terms including an ordinal number such as "first" and "second" used in the present specification may be used to describe various components, but the components are not limited by the terms. They are only used for distinguishing one component from other components. For example, the first component may be referred to as a second component without departing from the scope of the present disclosure, and similarly, the second component may be referred to as a first component. The term "and/or" includes a combination of a plurality of related listed items or any of a plurality of related listed items.

Moreover, terms like "~element," "~device," "~block," and "~module" used in the present specification may mean a unit for processing at least one function or operation. For example, the above terms may refer to at least one piece of hardware such as a field-programmable gate array (FPGA)/ application specific integrated circuit (ASIC), at least one piece of software stored in a memory or at least one process processed by a processor.

Marks attached to each operation are used to identify each operation, and these marks do not indicate the order between the operations, and each operation is performed differently from the stated order unless the context clearly indicates a specific order.

The expression "at least one of" used when referring to a list of elements in the specification can change a combination of the elements. For example, expression "at least one of a, b, or c" refers to only a, only b, only c, both a and b, both a and c, both b and c, or a combination of a, b, and c.

Hereinafter, an exemplary embodiment of a dialogue system and a dialogue processing method according to an aspect will be described in detail with reference to the accompanying drawings.

FIG. 1 is a block diagram illustrating an operation of a dialogue system according to an exemplary embodiment of the present disclosure.

Referring to FIG. 1, a dialogue system 1 according to an exemplary embodiment includes a speech recognition module 110 configured to convert a user's voice command into text, a natural language understanding module 120 configured to classify a domain or an intent for the voice command based on the converted text and to perform entity extraction and slot tagging, a control module 130 configured to generate a system response corresponding to the voice command based on an output of the natural language understanding module 120, a storage 140 configured to store an utterance history of the user, and a communication module 150 configured to communicate with a user terminal.

The speech recognition module 110 may be implemented as a speech to text (STT) engine, and a speech recognition algorithm may be applied to the user's utterance so that the user's utterance may be converted into text.

For example, the speech recognition module 110 may extract a feature vector from the user's utterance by applying feature vector extraction techniques such as cepstrum, linear predictive coefficient (LPC), mel frequency cepstral coefficient (MFCC) or filter bank energy.

Next, the recognition result may be obtained by comparing the extracted feature vector with a trained reference pattern. To the present end, an acoustic model that models and compares signal characteristics of speech or a language model that models a linguistic order relationship such as words or syllables corresponding to a recognized vocabulary may be used.

Furthermore, the speech recognition module 110 may convert the voice command into text based on a training model trained by machine learning or deep learning. In the exemplary embodiment of the present disclosure, there is no limitation on a method for converting the voice command into text by the speech recognition module 110, and the speech recognition module 110 may convert the voice command into text by applying various speech recognition technologies in addition to the above-described method.

The natural language understanding module 120 may apply a natural language understanding (NLU) technique to determine a user's intent included in the text. Accordingly, the natural language understanding module 120 may include an NLU engine that determines a user's intent by applying an NLU technique to an input sentence. Here, the text output by the speech recognition module 110 may be an input sentence input to the natural language understanding module 120.

For example, the natural language understanding module 120 may recognize a named entity from an input sentence. The named entity is a proper noun such as a person's name, a place name, an organization name, time, date, money, etc. Named entity recognition (NER) identifies the named entity in a sentence and determines the type of identified named entity. It is possible to understand the meaning of the sentence by extracting important keywords from the sentence through NER.

Furthermore, the natural language understanding module 120 may be configured to determine a domain from the input sentence. The domain may identify the subject of the user's utterance. For example, a domain representing various subjects such as providing information related to vehicle control, a schedule, weather or traffic conditions, text transmission, navigation, music, etc., may be determined based on the input sentence.

Furthermore, the natural language understanding module 120 may classify an intent corresponding to an input sentence, and may extract an entity required to perform the corresponding intent.

For example, when an input sentence is "turn on_air conditioner," the domain may be [vehicle control], the intent may be [turn on_air conditioner], and the entity required to perform control corresponding to the intent may be [temperature, airflow volume].

However, terms used for each dialogue system and their definitions may be different. Therefore, even if terms different from those in the disclosed embodiment are used, if the meanings or roles of the terms in the dialogue system are the same or similar, the terms may be included in the scope of the present disclosure.

As described above, an operation in which the natural language understanding module 120 extracts necessary information such as intent, domain, and entity from an input sentence may be performed using a machine learning or deep learning-based learning model (hereinafter, referred to as an intent classification model).

The dialogue system 1 according to various exemplary embodiments of the present disclosure may adjust the intent classification result based on the user's utterance history stored in the storage 140. A description related thereto will be provided later.

The control module 130 may be configured to generate a system response corresponding to the voice command of the user to provide a service corresponding to the user's intent. The system response may include a system utterance in response to the voice command and a signal for executing an intent corresponding to the voice command.

The communication module 150 may wirelessly communicate with a base Station or an access point (AP), and may exchange data with external devices through the base Station or AP.

For example, the communication module 150 may wirelessly communicate with an AP using Wi-Fi (WiFi™, IEEE 802.11 technology standard), or may communicate a base Station using CDMA, WCDMA, GSM, Long Term Evolution (LTE), 5G, WiBro, and the like.

The dialogue system 1 may include at least one memory in which a program for performing the above-described operation and an operation to be described later is stored and at least one processor for executing the stored program.

The speech recognition module 110, the natural language understanding module 120, and the control module 130 may each use a separate memory and processor, and may also share the memory and the processor.

That is, the speech recognition module 110, the natural language understanding module 120, and the control module 130 are divided based on their respective operations and do not represent physically separated components. Accordingly, as long as the operation of the voice recognition module 110, the natural language understanding module 120, or the control module 130 described above or to be described later is performed, the operation may be included in the scope of the present disclosure regardless of a name referring to the operation.

Furthermore, it is possible for the storage 140 to use a separate memory different from the memory in which the program for performing the operations of the speech recognition module 110, the natural language understanding module 120, and the control module 130 is stored, and it is also possible to share the same memory.

Figure 2:
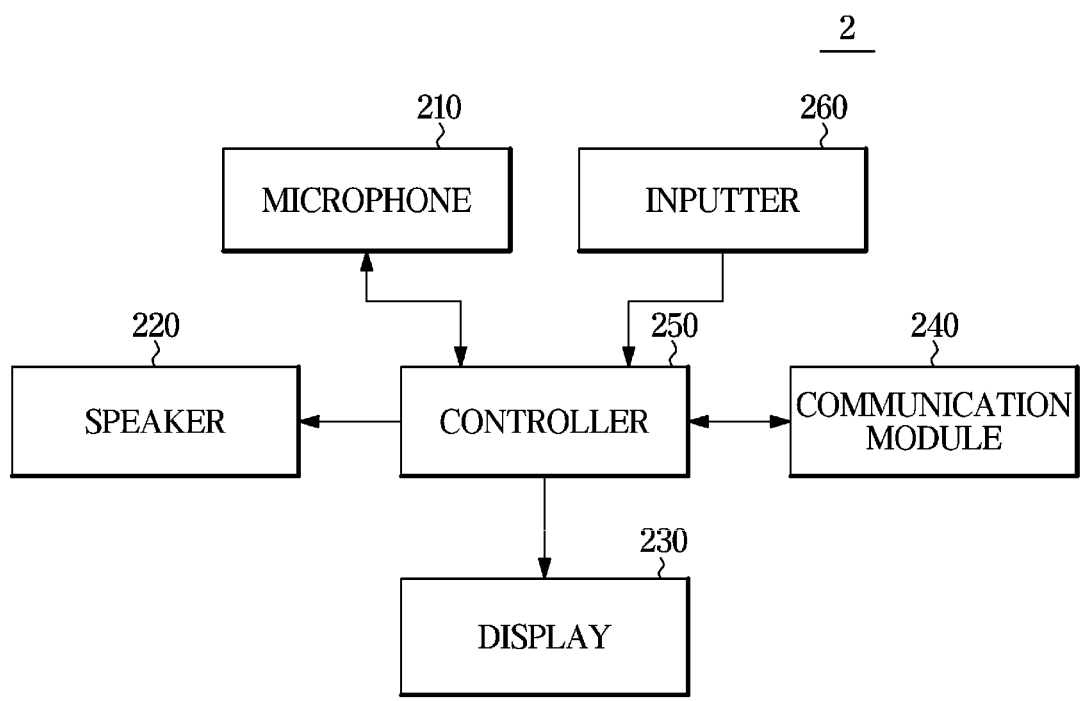
FIG. 2 is a block diagram illustrating an operation of a user terminal according to an exemplary embodiment of the present disclosure.
Figure 3:
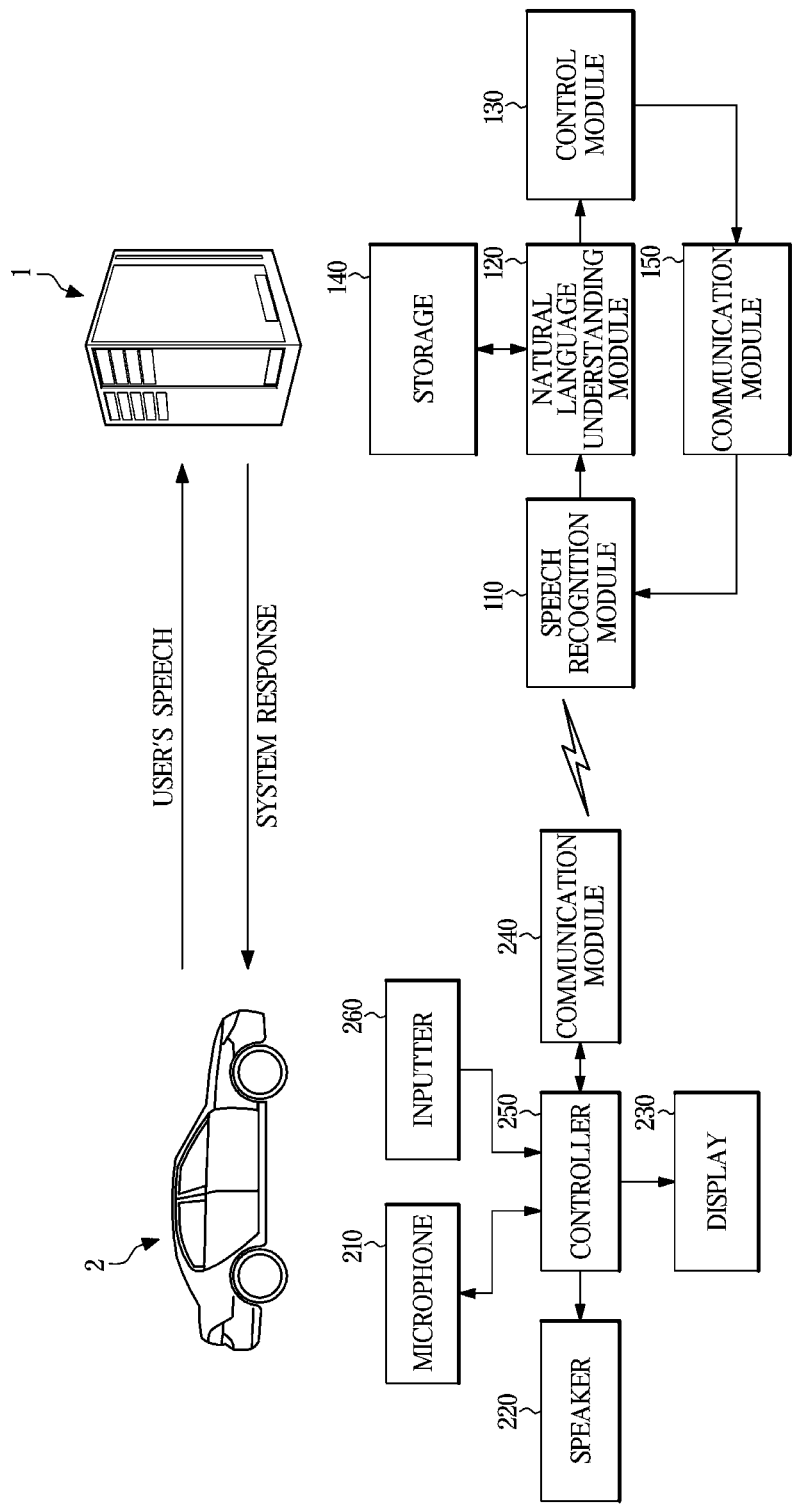
FIG. 3 and FIG. 4 are diagrams illustrating a mutual relationship between a dialogue system and a user terminal according to an exemplary embodiment of the present disclosure.
Figure 4:
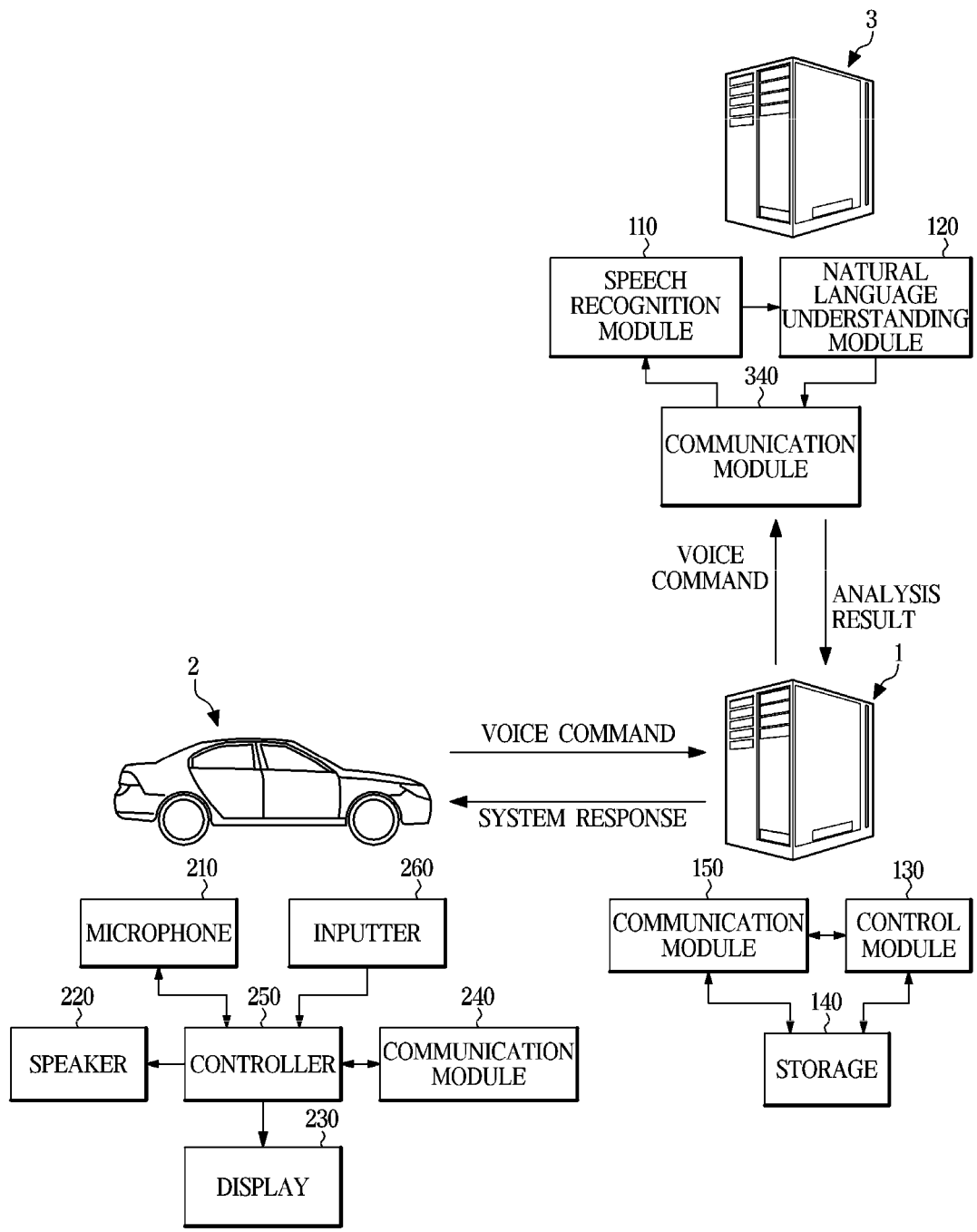

FIG. 2 is a block diagram illustrating an operation of a user terminal according to an exemplary embodiment of the present disclosure, and FIG. 3 and FIG. 4 are diagrams illustrating a mutual relationship between a dialogue system and a user terminal according to an exemplary embodiment of the present disclosure.

A user terminal 2 according to various exemplary embodiments of the present disclosure is configured as a gateway between the user and the dialogue system 1. For example, the user terminal 2 may be a mobile device such as a smartphone, a tablet PC, or a laptop PC, a wearable device such as a smart watch or smart glasses, home appliances such as a TV provided with microphone and speaker, a refrigerator, an air conditioner, an air purifier, a vacuum cleaner, or a washing machine, or an AI speaker.

Alternatively, a vehicle may be a user terminal. The voice command of the user may be input through a microphone provided in the vehicle, and the voice command may be transmitted to the dialogue system 1 through a communication module provided in the vehicle.

Furthermore, when a system response is transmitted from the dialogue system 1, a process corresponding to the system response may be performed by controlling a speaker or display provided in the vehicle or controlling other components of the vehicle.

Referring to FIG. 2, the user terminal 2 may include a microphone 210, a speaker 220, a display 230, a communication module 240, a controller 250, and an input device 260.

The communication module 240 may include a wireless communication module that wirelessly exchanges data with external devices. Furthermore, the communication module 240 may further include a wired communication module for exchanging data with external devices by wire.

The wired communication module may exchange data with an external device connected through a USB terminal or an AUX terminal.

The wireless communication module may wirelessly communicate with a base Station or an AP, and may exchange data with external devices through the base Station or AP.

For example, the wireless communication module may wirelessly communicate with an AP using Wi-Fi (WiFi™, IEEE 802.11 technology standard), or may communicate with a base Station using CDMA, WCDMA, GSM, LTE, 5G, WiBro, etc.

Furthermore, the wireless communication module may directly communicate with external devices. For example, the wireless communication module may use Wi-Fi Direct, Bluetooth (Bluetooth™, IEEE 802.15.1 technology standard), ZigBee (ZigBee™, IEEE 802.15.4 technology standard), or the like to exchange data with external devices located within a short distance.

For example, when the user terminal 2 is implemented as a vehicle, the communication module 240 may communicate with a mobile device located inside the vehicle through Bluetooth communication to receive information (user's image, user's speech, contact information, schedule, etc.) obtained by or stored in a mobile device, or may communicate with the dialogue system 1 through Wi-Fi or 4G or 5G communication to transmit a voice command of the user or receive a system response corresponding to the voice command.

The voice command may be input to the microphone 210. When the user terminal 2 is implemented as a vehicle, the user may be a driver or a passenger. The microphone 210 may be provided at a position such as a steering wheel, a center fascia, a headliner, or a rearview mirror to receive the voice command from the driver or the passenger in the front seat.

Furthermore, two or more microphones 210 may be provided. In the instant case, a first microphone may be provided in a position for receiving a voice command of the driver as described above, and a second microphone may be provided in at least one of various positions such as an armrest of a rear seat, a B pillar or C pillar, a headliner, a rear seat door, and the like.

When the voice command is input, the microphone 210 converts the voice command in the form of a sound wave into an audio signal which is an electrical signal, and outputs the audio signal. Accordingly, the voice command after being output from the microphone 210 may be processed in the form of an audio signal.

The speaker 220 may output various types of audio related to the system response received from the dialogue system 1. The speaker 220 may output a system utterance transmitted from the dialogue system 1 or may output a content signal corresponding to the system response.

Furthermore, audio of music, radio, or multimedia content may be output regardless of the system response, or audio for route guidance may be output while a navigation function is executed.

The display 230 may display various types of information related to the system response received from the dialogue system 1. The display 230 may display a system utterance output through the speaker 220 as text, and may display a plurality of items as a list when a user's selection of the plurality of items is required to execute an intent corresponding to a user's utterance.

Furthermore, the display 230 may display information required to perform other functions of the user terminal 2, such as outputting multimedia content regardless of the system response.

For example, when the user terminal 2 is implemented as a vehicle, the display 230 may include an Audio, Video and Navigation (AVN) display, a cluster display, or a head up display (HUD) provided on a center fascia of the vehicle.

Alternatively, the display 230 may include a rear seat display provided on the rear of the head of the front seat so that a passenger in the rear seat can see the rear seat display, or may include, when the vehicle is a multi-seater vehicle, a display mounted on the headliner.

The display 230 may only need to be provided at a position where the user riding in the vehicle can view the display 230, and there is no other limitation on the number or position of the display 230.

The user terminal 2 may include the input device 260 for manually receiving a user's command in addition to the microphone 210. The input device 260 may be provided in the form of a button, a jog shuttle, or a touch pad. When the input device 260 is provided in the form of a touch pad, a touch screen may be implemented together with the display 230.

For example, when the user terminal 2 is implemented as a vehicle, the input device 260 may include an input device provided in the form of a button or a jog shuttle in an area in which audio video navigation (AVN) of the center fascia is provided, an area in which a gearbox is provided, or a steering wheel.

Furthermore, to receive a control command regarding the passenger seat, the input device 260 may include an input device provided on the door of each seat or an input device provided on an armrest of a front seat or an armrest of a rear seat.

The controller 250 may control components of the user terminal 2 so that the above-described operations may be performed.

When the user terminal 2 is implemented as the vehicle, as shown in FIG. 3, the user's voice command input through the microphone 210 of the user terminal 2 may be transmitted to the dialogue system 1 through the communication module 240.

When the communication module 150 of the dialogue system 1 receives a voice command and the speech recognition module 110 and the natural language understanding module 120 output an analysis result of the voice command, the control module 130 may be configured to generate an appropriate system response based on the analysis result for the voice command, and may transmit a system response to the user terminal 2 through the communication module 150. In the instant case, the natural language understanding module 120 may adjust and output the intent classification result for the voice command based on an utterance history of the user.

The dialogue system 1 may be implemented by a server. In the instant case, the dialogue system 1 does not necessarily have to be implemented by one server, and may be implemented by a plurality of physically separated servers.

Alternatively, as shown in FIG. 4, the speech recognition module 110 and the natural language understanding module 120 may be implemented by a separate external system 3. In the instant case, when the dialogue system 1 receives the user's voice command from the user terminal 2, the dialogue system 1 may transmit the received voice command to the external system 3 and may receive the analysis result of the voice command from the external system 3.

The control module 130 of the dialogue system 1 may obtain the user's utterance history from the storage 140 and may adjust the analysis result of the voice command based on the obtained utterance history.

The control module 130 may be configured to generate a system response corresponding to the voice command based on the adjusted analysis result and may transmit the generated system response to the user terminal 2 through the communication module 150.

Accordingly, when the natural language understanding module 120 is included in the dialogue system 1, the adjusting of the intent classification result based on the user's speech history may be performed by the natural language understanding module 120, and when the natural language understanding module 120 is included in the external system 3, the adjusting of the intent classification result may be performed by the control module 130 of the dialogue system 1.

Figure 5:
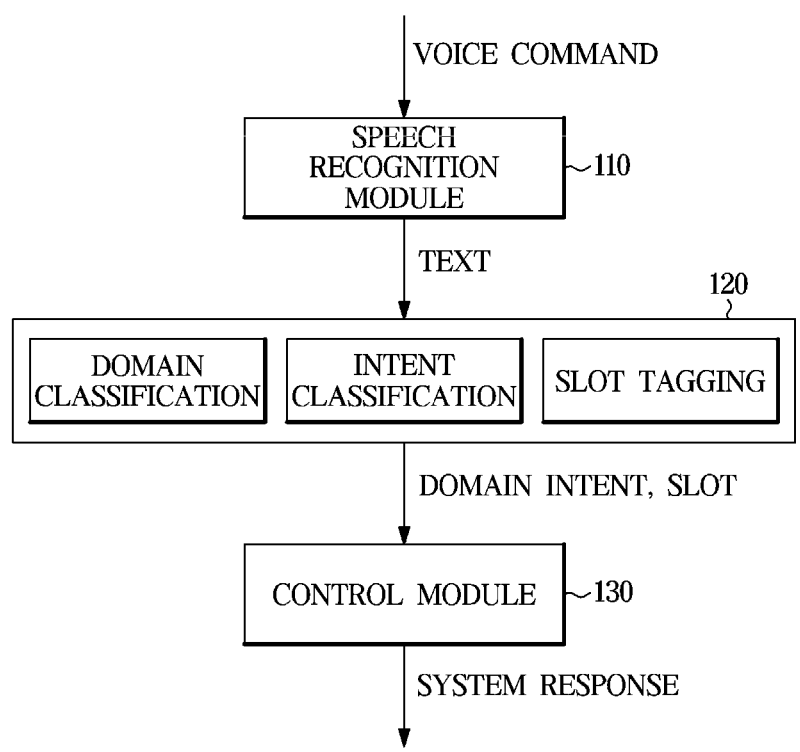
FIG. 5 is a block diagram illustrating an operation performed by each module in a dialogue system according to an exemplary embodiment of the present disclosure.
Figure 6:
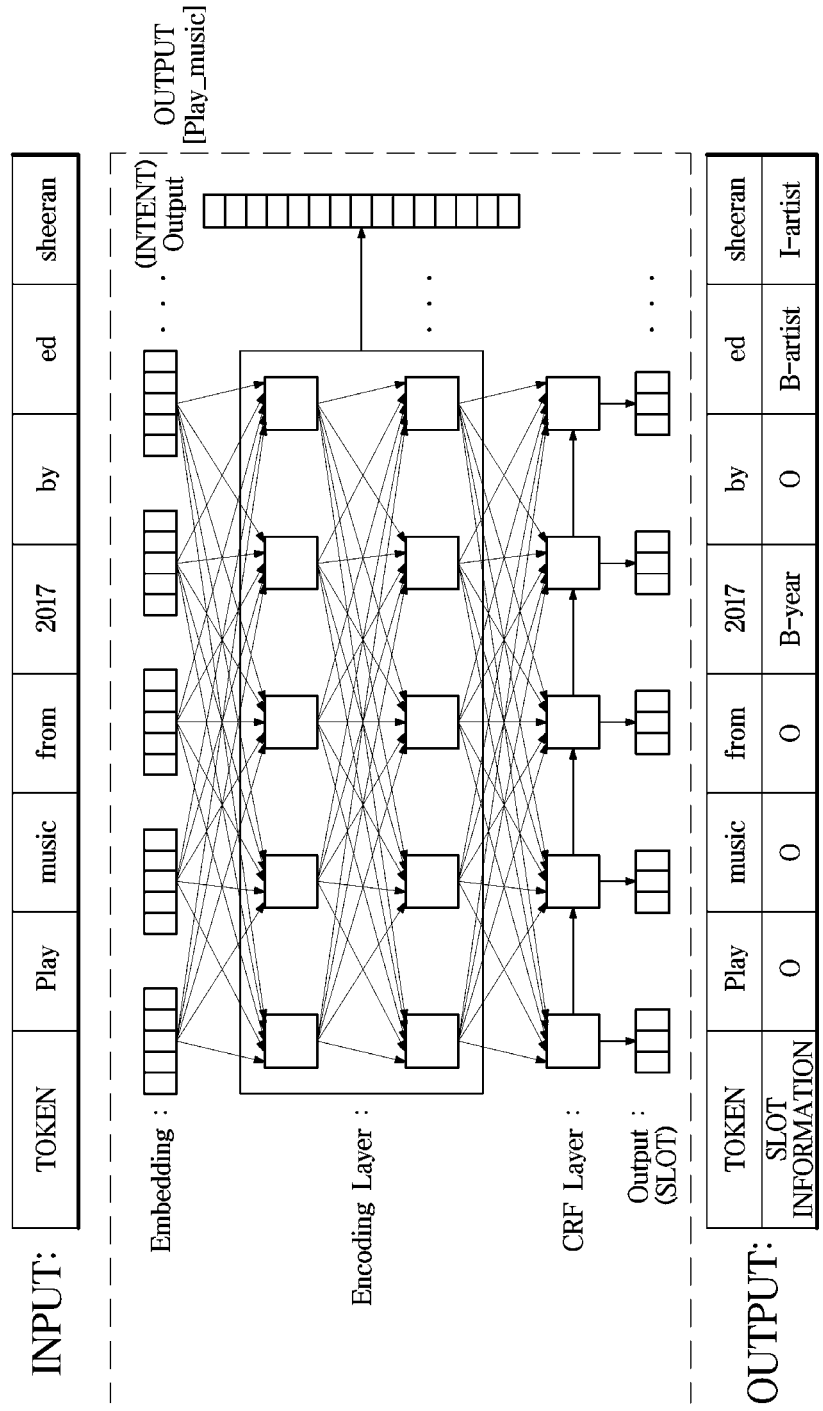
FIG. 6 is a diagram schematically illustrating a structure of a classification model applied to a natural language understanding module of a dialogue system according to an exemplary embodiment of the present disclosure.

FIG. 5 is a block diagram illustrating an operation performed by each module in a dialogue system according to an exemplary embodiment of the present disclosure, and FIG. 6 is a diagram schematically illustrating a structure of a classification model applied to a natural language understanding module of a dialogue system according to an exemplary embodiment of the present disclosure.

Referring to FIG. 5, when a user's voice command is input to the speech recognition module 110, the speech recognition module 110 may detect a speech part in the input voice command, perform pre-processing such as removing noise, and then convert the pre-processed voice command into text.

The text is input to the natural language understanding module 120, and the natural language understanding module 120 may perform morphological analysis, domain classification, intent classification, slot tagging, etc., on the input text to obtain information necessary to understand the user's intent.

Also referring to FIG. 6, the natural language understanding module 120 may divide the input text for natural language analysis into tokens, which are small units for analysis. A token may be a word unit or a morpheme unit. Alternatively, the token may be a sentence unit.

For example, when the input text is "play music by Ed Sheeran from 2017," tokenization may be performed in units of words as shown in FIG. 6.

The natural language understanding module 120 may classify the domain and intent corresponding to the user's voice command and may tag a slot by the intent classification model trained by deep learning. In the present example, a case where domain and intent classification and slot tagging are performed together by one model is illustrated, but it is also possible to use a separate model for slot tagging according to design.

An input sequence input to the intent classification model may be constituted of tokens, and a word embedding vector generated by performing word embedding on the input sequence may be input to an encoding layer.

The encoding layer may encode tokens of the input sequence expressed as a vector. The encoding layer may include a plurality of hidden layers, and an algorithm such as a recurrent neural network (RNN) or a bidirectional gated recurrent unit (BiGRU) may be used.

The intent classification model may classify intents based on the output of the encoding layer. For example, intents corresponding to the input text may be classified by comparing a vector of a predetermined intent with the encoded input sequence, and at the instant time, the softmax function, which is one of activation functions used in a classification task, may be used to match the input sequence to the intent.

It is possible to determine a score indicating a matching probability with the text input for each of predetermined intents. The intent having the highest matching probability may be determined as the intent corresponding to the input text. However, when the highest matching probability is less than a threshold, the input text may be classified as out of domain (OOD).

In the present example, [play_music] may be determined as the intent corresponding to the input text. Furthermore, for each predetermined intent, a domain to which the corresponding intent belongs may also be defined. In the present example, a domain to which the intent of [play_music] belongs may be predetermined as [Music].

Furthermore, the intent classification model may perform slot tagging using a conditional random field (CRF) layer. Each hidden state of the encoding layer may be input to the CRF layer. Alternatively, it is also possible to use a long short-term memory model (LSTM) for slot tagging.

A slot represents meaningful information related to an intent included in an utterance. The slot may be defined by a type indicating a classification system to which the value of the slot belongs, and the role and value of the slot in a sentence. The slot may be filled by the entity described above.

The role of the slot may depend on the intent. For example, in an input sentence of "Let's go from Seoul Station to Busan Station," "Seoul Station" and "Busan Station" correspond to slots of the same type, but in the sentence, the slots of "Seoul Station" is a starting point and "Busan Station" is a destination, so their roles are different. Furthermore, "Seoul Station" in an input sentence of "Tell me address of Seoul Station" is the same type as "Seoul Station" in the input sentence of "Let's go from Seoul Station to Busan Station," but their roles in the sentence are different as a search target.

Furthermore, the type of slot may also depend on the intent. For example, in an input sentence of "Guide me to Yanghwa Bridge," the type of "Yanghwa Bridge" corresponds to a POI, but in an input sentence of "Play Yanghwa Bridge," the type of "Yanghwa Bridge" may be classified as a song title.

In the example of FIG. 6, the type of slot "2017" may be tagged as "year," and the types of slots "Ed" and "Sheeran" may be tagged as "artist," respectively.

Referring again to FIG. 5, when the natural language understanding module 120 outputs analysis results of the domain, intent, or slot corresponding to the voice command, the control module 130 may be configured to generate a system response corresponding to the voice command based on the output analysis results.

For example, when the intent is vehicle-related control, a control signal for performing the vehicle-related control may be generated and transmitted to the user terminal 2.

Alternatively, when the intent is to provide specific information, the specific information may be retrieved and the retrieved information may be transmitted to the user terminal 2. If necessary, it is also possible for the information to be retrieved by another external server.

Alternatively, when the intent is to provide specific content, the specific content corresponding to the intent may be transmitted to the user terminal 2.

Alternatively, when a service corresponding to the user's intent is continuation of a simple conversation, a system utterance corresponding to the user's utterance may be generated and transmitted to the user terminal 2.

FIG. 7, FIG. 8, FIG. 9 and FIG. 10 are diagrams illustrating a case in which a system response that does not correspond to an actual user's intent is generated when a user of a dialogue system utters a voice command.

Figure 7:
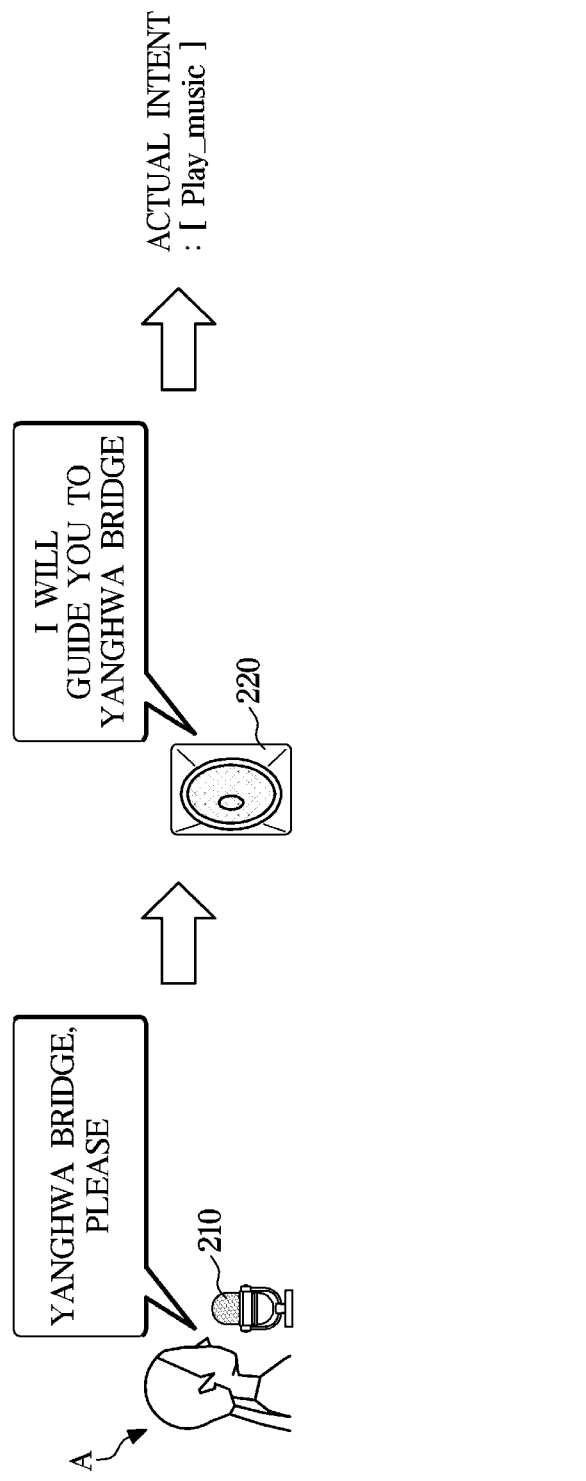
FIG. 7, FIG. 8, FIG. 9 and FIG. 10 are diagrams illustrating a case in which a system response that does not correspond to an actual user's intent is generated when a user of a dialogue system utters a voice command.

Referring to the example of FIG. 7, in a case in which user A utters a voice command "Yanghwa Bridge, please," when the dialogue system classifies an intent for the voice command of user A as route guidance, that is, [search_poi] (domain: [navigation]), a system utterance such as "I will guide you to Yanghwa Bridge" may be output and route guidance may be performed with "Yanghwa Bridge" as a destination.

However, the actual intent for the voice command of user A may be [play_music]. That is, user A may have uttered the voice command to listen to a song "Yanghwa Bridge."

Figure 8:
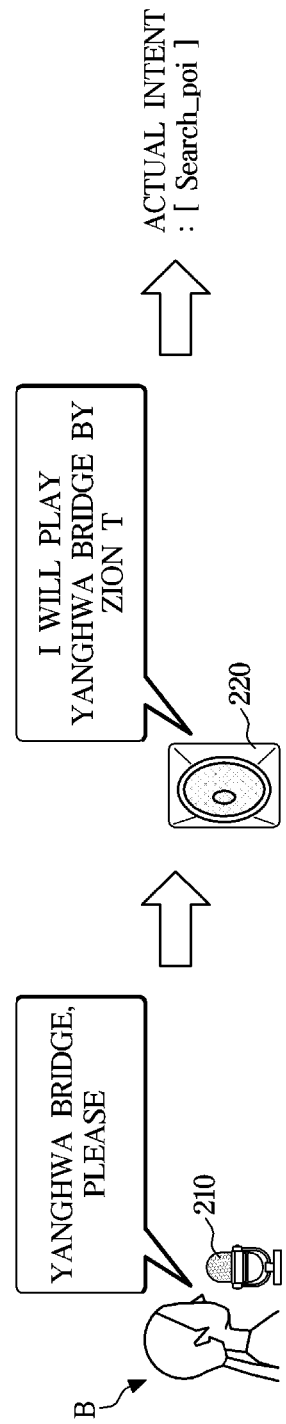

Referring to the example of FIG. 8, in a case in which user B utters a voice command "Yanghwa Bridge, please," when the dialogue system classifies an intent for the voice command of user B as play music, that is, [play_music] (domain: [music]), a system utterance such as "I will play Yanghwa Bridge by Zion T" may be output and the song "Yanghwa Bridge" by an artist called "Zion T" may be played.

However, the actual intent for the voice command of user B may be [search_poi]. That is, user B may have uttered the voice command to receive route guidance with "Yanghwa Bridge" as a destination.

When intents are classified using the trained classification model, the classification result may be biased toward training data used for training the classification model, and when the biased classification result does not match the user's intent, a result different from the user's intent may be output.

When a sentence with ambiguity is input to the intent classification model as in the examples of FIGS. 7 and 8, because the result is biased to the training data rather than the user's tendency, the meaning of the sentence with ambiguity may be determined to be biased to the training data, outputting a result different from the user's intent.

Figure 9:
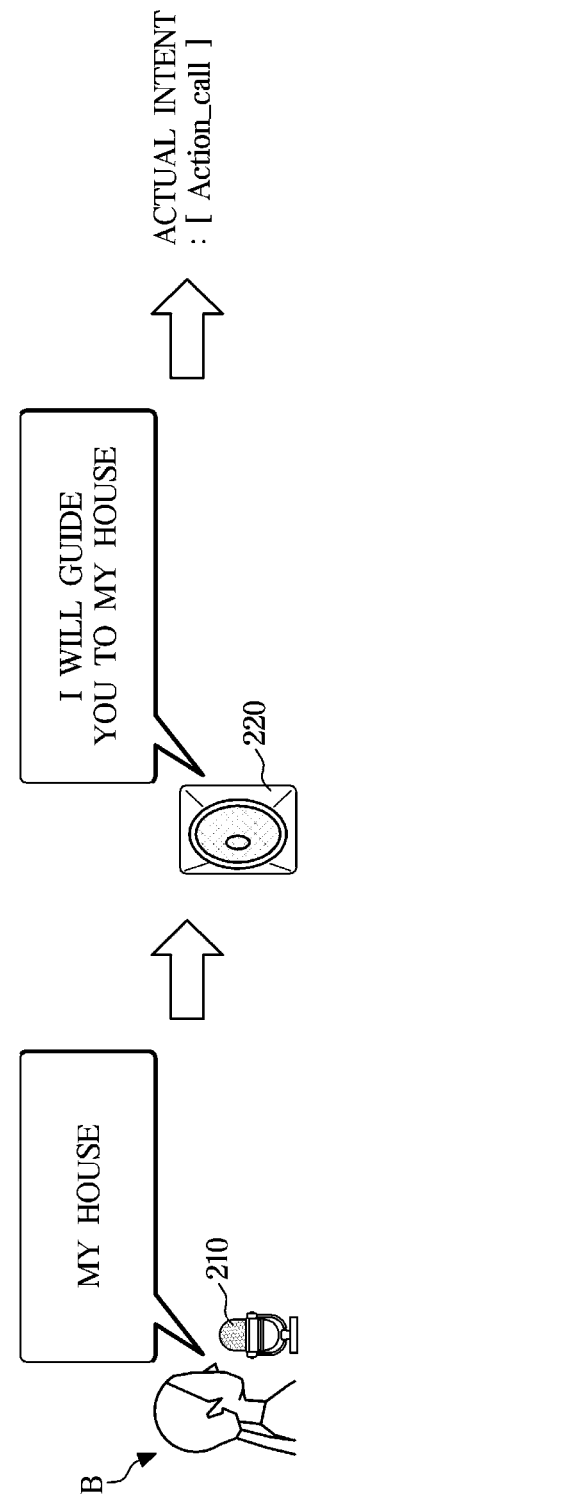

Referring to the example of FIG. 9, in a case in which user A utters a voice command "My house," when the dialogue system classifies an intent for the voice command of user A as route guidance, that is, [search_poi] (domain: [navigation]), a system utterance such as "I will guide you to My house" may be output and route guidance may be performed with "My house" as a destination.

However, the actual intent for the voice command of user A may be [action_call]. That is, user A may have uttered the voice command to make a call to "My house."

Figure 10:
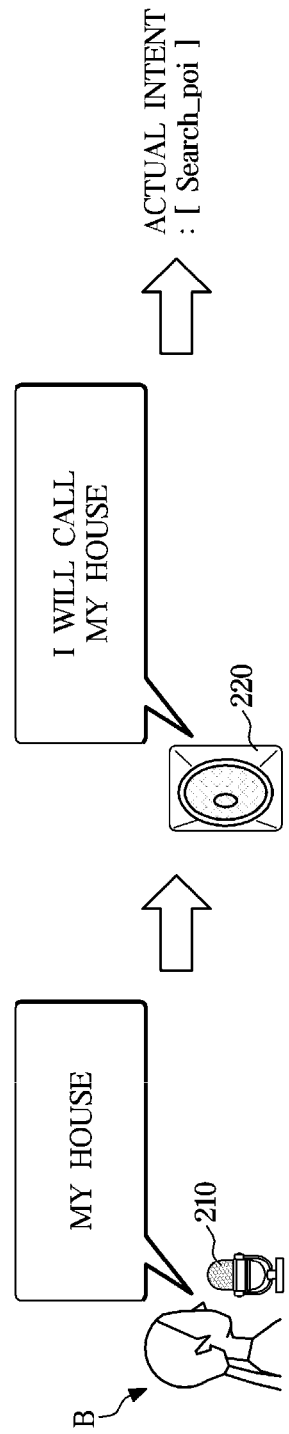

Referring to the example of FIG. 10, in a case in which user B utters a voice command "My house," when the dialogue system classifies an intent for the voice command of user B as making a call, that is, [action_call] (domain: [call]), a system utterance such as "I will call My house" may be output and a call may be made to a phone number stored as "My house."

However, the actual intent for the voice command of user B may be [search_poi]. That is, user B may have uttered the voice command to receive route guidance with "My house" as a destination.

When the user's voice command is too short as in the examples of FIG. 9 and FIG. 10, a result different from the user's actual intent may be output because information necessary to understand the user's intent is not sufficient. When the user terminal 2 is a vehicle, since the user concentrates on driving, the user often finds it difficult to pay attention to his or her own utterance.

Accordingly, in the dialogue system 1 and the dialogue processing method using the same according to an exemplary embodiment of the present disclosure, when determining an intent corresponding to a voice command, the results of the intent classification model may be adjusted in consideration of the individual utterance history of the user, providing customized results.

Figure 11:
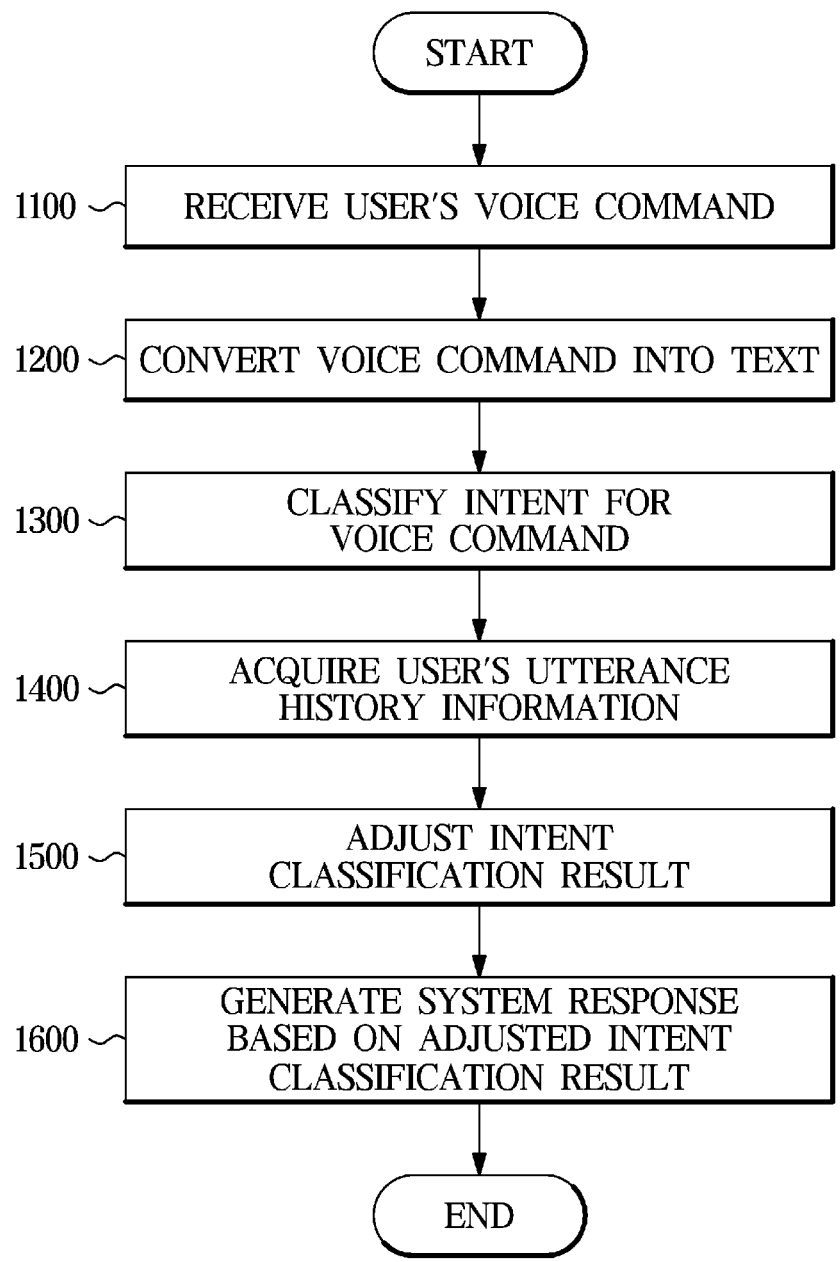
FIG. 11 is a flowchart illustrating a dialogue processing method according to an exemplary embodiment of the present disclosure.
Figure 12:
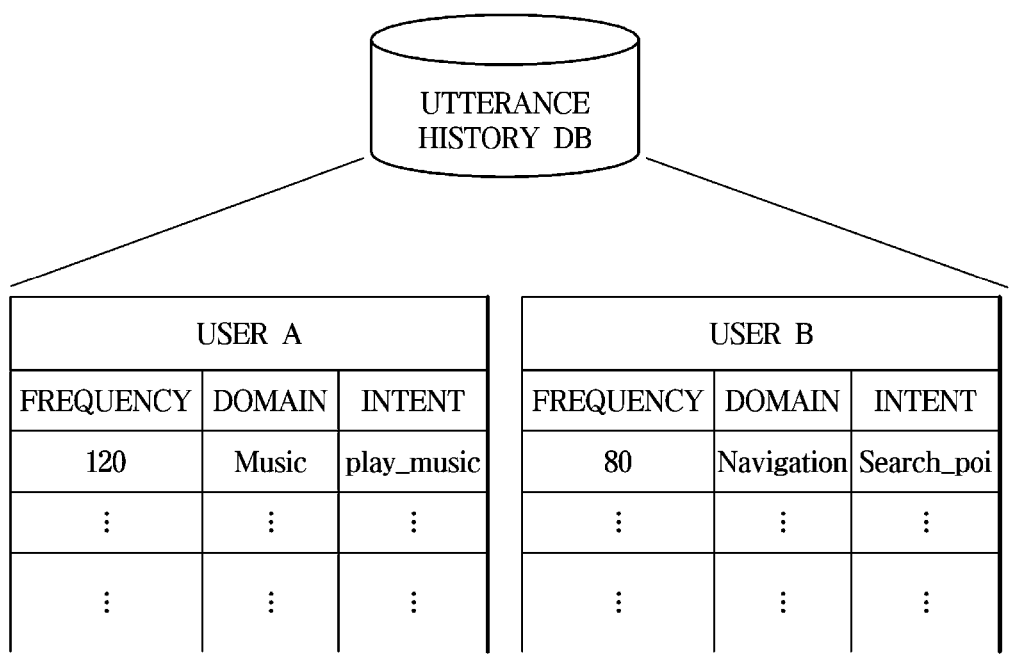
FIG. 12 is a diagram illustrating an utterance history DB stored in a dialogue management system according to an exemplary embodiment of the present disclosure.
Figure 13:
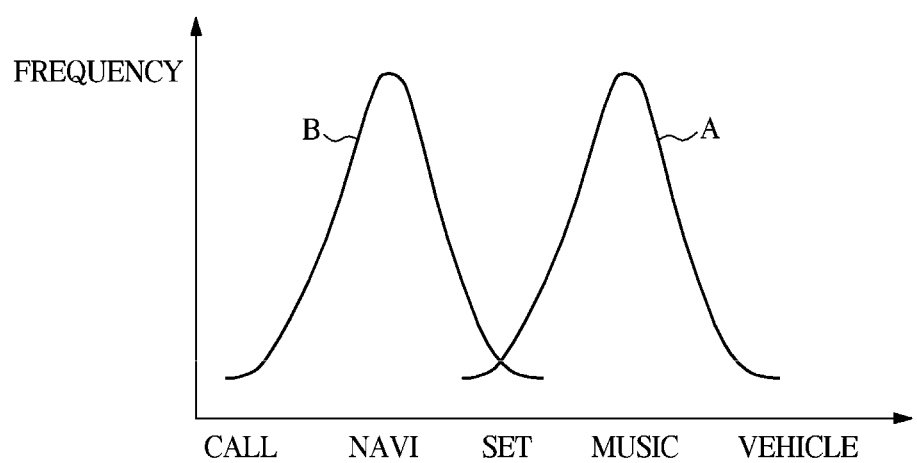
FIG. 13 is a diagram illustrating information obtainable from an utterance history DB.

FIG. 11 is a flowchart illustrating a dialogue processing method according to an exemplary embodiment of the present disclosure, FIG. 12 is a diagram illustrating an utterance history DB stored in a dialogue management system according to an exemplary embodiment of the present disclosure, and FIG. 13 is a diagram illustrating information obtainable from an utterance history DB.

The dialogue processing method according to various exemplary embodiments of the present disclosure may be performed by the above-described dialogue system 1. Accordingly, the description of the dialogue system 1 may be applied to the exemplary embodiment of the dialogue processing method, even if there is no separate mention thereof. Conversely, the description of the dialogue processing method may also be applied to the dialogue system 1, even if there is no separate mention thereof.

Referring to FIG. 11, in operation 1100, a user's voice command is received from the user terminal 2.

The voice command input to the microphone 210 of the user terminal 2 may be transmitted to the dialogue system 1 in the form of an audio signal, and the communication module 150 of the dialogue system 1 may receive the voice command transmitted from the user terminal 2.

In operation 1200, the received voice command is converted into text.

The speech recognition module 110 detects a speech part in the received voice command, performs pre-processing such as removing noise, and then converts the pre-processed voice command into text.

In operation 1300, the intent for the voice command is classified based on the text.

As described above, intent classification for the voice command may be performed using a trained intent classification model. Furthermore, domains may be classified together with intents, and slot tagging may also be performed according to the design of the intent classification model.

Meanwhile, when the speech recognition module 110 and the natural language understanding module 120 are provided in a separate external system 3, operation 1200 of converting the voice command into text and operation 1300 of classifying the intent may be omitted in the dialogue processing method according to an exemplary embodiment of the present disclosure. In the instant case, the dialogue processing method according to various exemplary embodiments of the present disclosure may include obtaining an intent classification result for the voice command from the external system 3.

Utterance history information of the user is obtained in operation 1400, and an intent classification result is adjusted based on the obtained utterance history information in operation 1500.

Here, the user may be a user who has input the corresponding voice command. Referring to FIG. 12, an utterance history DB may be stored in the storage 140 of the dialogue system 1, and the utterance history DB may include utterance history information for each user.

Alternatively, when the utterance history DB is stored in the external system 3, the dialogue system 1 may obtain the user's utterance history information by making a request to the external system 3.

The utterance history information may be stored in various ways. For example, information related to a frequency of domain and intent which is the processing result for the voice command may be stored for each user. Alternatively, the voice command (text) uttered by the user may also be stored together with the domain and intent thereof.

Based on the utterance history information, a domain usage distribution (or an intent usage distribution) for each user as shown in FIG. 13 may be obtained. That is, based on the utterance history information, information on which domain and which intent is frequently used by each user may be obtained.

Furthermore, the utterance history information may include information on at least one of an utterance time or utterance location of the voice command.

The number of intents supported by the dialogue system 1 are considerably greater than the number of intents actually used by the user. Among the intents supported by the dialogue system 1, intents not actually used by the user may act as noise in intent classification.

As described above, the dialogue system 1 may obtain information on the intent and domain that the user mainly utilizes from the utterance history information for each user, and may use the present information when the intents are classified, reducing the probability of intent misclassification.

Meanwhile, the user's utterance history information may be obtained from log data remaining when the user utilizes the dialogue system 1. When the user accesses the dialogue system 1 through an individual ID, utterance history information may be accumulated for each user.

Otherwise, the utterance history may be matched with identification information of the user terminal 2 to be accumulated. When the user terminal 2 is a vehicle, the user's utterance history may be matched with vehicle identification information such as a vehicle identification number (VIN) and may be accumulated.

Accordingly, the user's utterance history information referred to in an exemplary embodiment of the present disclosure may relate to the individual user or the user terminal 2.

The natural language understanding module 120 of the dialogue system 1 may adjust the intent classification result based on the utterance history information of the user who has input the voice command.

When text is input, the intent classification model used by the natural language understanding module 120 may be configured to determine a score indicating a matching probability with text input for each of predetermined intents. The score determined for each of the predetermined intents may be included in the intent classification result.

For example, the score may be redetermined by assigning a weight based on the utterance history for each user to the score of each intent. In the instant case, a higher weight may be assigned to an intent which is more frequently used by the user through the voice command. That is, in the utterance history information of the corresponding user, a higher weight may be assigned to an intent having a higher frequency, and a lower weight may be assigned to an intent having a lower frequency.

Furthermore, it is possible to distort the intent classification result so that the natural language understanding module 120 decreases a score which is less than a threshold and increases a score which is greater than or equal to the threshold.

In the instant case, it is possible to further increase the score of an intent having a high frequency of use by the corresponding user among the scores equal to or greater than the threshold. An amount of decrease in the score which is less than the threshold and an amount of increase in the score of the intent having a high frequency of use by a corresponding user may be proportional to each other. For example, when the sum of the scores for the plurality of predetermined intents is 1.0, the score of the intent with high frequency of use may be increased as much as the score less than the threshold is decreased.

Alternatively, the natural language understanding module 120 distorts the intent classification result so that the scores less than the threshold are lowered and the scores equal to or greater than the threshold are raised. It is also possible to further increase the rate of increase of the scores for the intents having a high frequency of use by the corresponding user and relatively decrease the rate of increase of the scores for the other intents.

As described above, the user's utterance history information may further include at least one of information on an utterance time or an utterance location of the voice command. In the instant case, in adjusting the intent classification result, it is also possible to further use information such as the utterance time or utterance location of the voice command.

For example, the scores may be redetermined by assigning a high weight to a score of an intent having a high frequency of use at the utterance time or in the utterance location matching the current utterance time or utterance location.

The utterance time matching the current utterance time may be determined based on morning/afternoon, or may be determined based on the morning rush hour/work hours/evening rush hour. Alternatively, it is also possible to determine matching of the utterance time based on a shorter time interval.

For example, when the current utterance time is 8:00 am, the utterance time matching the current utterance time may be the morning or the morning rush hour. In the instant case, the natural language understanding module 120 may be configured to determine intents that are frequently used in the morning or at the morning rush hour from the user's utterance history information, and may assign a high weight to the scores of the determined intents.

The utterance location matching the current utterance location may be determined based on a city unit or a smaller administrative unit, or may be determined based on a stored point of interest (POI) or landmark.

For example, when the current utterance location is a company or the vicinity of the company, the utterance location matching the current utterance location may be the company or the vicinity of the company. In the instant case, the natural language understanding module 120 may be configured to determine intents that are frequently used at or near to the company from the user's utterance history information, and may assign a high weight to the scores of the determined intents.

As described above, the type or role of the slot may depend on the intent. Accordingly, the natural language understanding module 120 may perform slot tagging based on the adjusted intent classification result. For example, when the determined intent for the input sentence "My house" is [search_poi], the type of an entity "My house" may be a POI, and the role thereof may be a destination. Furthermore, when the determined intent is [action_call], the type of the entity "My house" is a phone number, and the role thereof is a recipient.

When the intent classification model outputs a tagging result of part-of-speech for the input sentence, the natural language understanding module 120 may perform slot tagging with reference to the adjusted intent classification result.

Alternatively, when the intent classification model outputs a slot tagging result for the input sentence, the natural language understanding module 120 may adjust the slot tagging result with reference to the adjusted intent classification result.

In operation 1600, the control module 130 generates a system response based on the adjusted intent classification result.

As described above, the system response may include the system utterance for the voice command and a signal for executing the intent corresponding to the voice command. For example, when the intent is determined to make a call, a signal for making a call may be generated together with a system utterance for guiding the execution of the making a call, and when the intent is determined to be route guidance, a signal for executing route guidance may be generated together with a system utterance to guide the execution of route guidance. Furthermore, when the intent is determined to play music, a signal for executing "play music" may be generated together with a system utterance guiding the execution of "play music."

The generated system response may be transmitted to the user terminal 2, and the user terminal 2 may perform control according to the transmitted system response. The user terminal 2 may output a system utterance through the speaker 220, and may perform an operation such as making a call, executing route guidance, or playing music according to a signal included in the system response.

Figure 14:
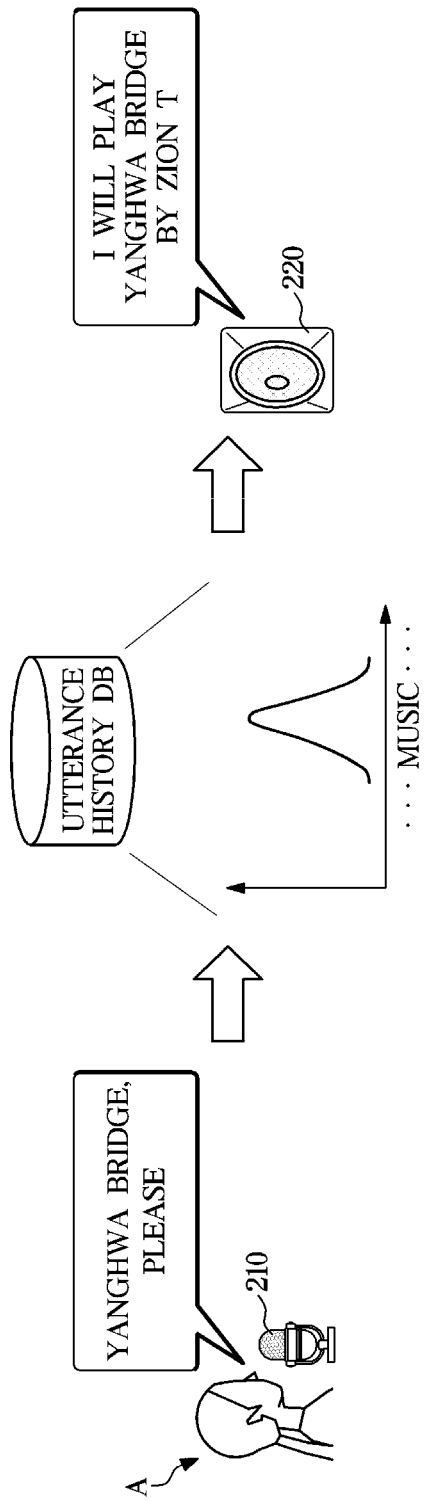

FIG. 14, and FIG. 15 are diagrams illustrating examples of intent classification results output by a dialogue system and a dialogue processing method according to an exemplary embodiment of the present disclosure.

In FIG. 14, and FIG. 15, a case in which user A and user B respectively input a voice command "Yanghwa Bridge, please" into the microphone 210 is exemplified.

Based on utterance history information of user A obtained from the storage 140 or the external system 3, user A frequently used a music domain. That is, user A has a high frequency of use of the music domain.

The natural language understanding module 120 of the dialogue system 1 may adjust the intent classification result by use of the present information. Accordingly, even if the intent classification model classifies the intent for the voice command "Yanghwa Bridge, please" as route guidance [search_poi] (domain: [navigation]), the final intent may be determined to be play music [play_music] (domain: [music]) through adjustment of the intent classification result according to the above-described process.

The dialogue system 1 may be configured to generate a system response based on the adjusted intent classification result, and the generated system response may be transmitted to the user terminal 2.

The user terminal 2 may output a system utterance of "I will play Yanghwa Bridge by Zion T" through the speaker 220 and may execute "play music."

Based on utterance history information of user B obtained from the storage 140 or the external system 3, user B frequently used a navigation domain. That is, user B has a high frequency of use of the navigation domain.

The natural language understanding module 120 of the dialogue system 1 may adjust the intent classification result by use of the present information. Accordingly, contrary to the example of FIG. 14, even if the intent classification model classifies an intent for the voice command "Yanghwa Bridge, please" as play music [play_music] (domain: [music]), the final intent may be determined to be route guidance [search_poi] (domain: navigation) by adjusting the intent classification result according to the above-described process.

The dialogue system 1 may be configured to generate a system response based on the adjusted intent classification result, and the generated system response may be transmitted to the user terminal 2.

The user terminal 2 may output a system utterance of "I will guide you to Yanghwa Bridge" through the speaker 220 and may execute route guidance.

Meanwhile, the dialogue processing method according to the disclosed exemplary embodiments of the present disclosure may be stored in a recording medium in the form of instructions executable by a computer. The instructions may be stored in the form of program code, and may perform, when executed by a processor, operations of the disclosed exemplary embodiments of the present disclosure. The recording medium may be implemented as a computer-readable non-transitory recording medium.

The computer-readable recording medium includes any type of recording medium in which the instructions readable by the computer are stored. For example, there may be a read only memory (ROM), a random access memory (RAM), a magnetic tape, a magnetic disk, a flash memory, an optical data storage device, and the like.

According to the exemplary embodiments described above, by only adjusting the results of the existing intent classification model in the inference stage without adjusting the training data of the intent classification model, which consumes a lot of time and money, or updating the intent classification module, it is possible to obtain appropriate results according to each user's tendency to use the dialogue system.

Therefore, it is possible to provide a service that meets the actual intent of the user even when the voice command does not contain sufficient information due to characteristics of the use environment of the dialogue system, or when it is difficult to specify the intent because the voice command includes an ambivalent expression.

According to a dialogue processing method and a dialogue management system according to an exemplary embodiment of the present disclosure, by adjusting the output of an intent classification model based on an utterance history for each user, it is possible to minimize the output of results different from the user's actual intent because the intent classification result for the user's utterance is biased toward training data.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A dialogue processing method, which is performed by a dialogue system including one or more processors and a memory configured to store one or more programs executed by the one or more processors, the method comprising:
obtaining an intent classification result for a voice command of a user by use of a trained intent classification model;
obtaining utterance history information of the user;
adjusting the intent classification result based on the obtained utterance history information of the user;
generating a system response based on the adjusted intent classification result; and
transmitting the generated system response to a user terminal,
wherein the utterance history information of the user includes information on a frequency of an intent used by the user through utterance of the voice command,
wherein the intent classification result includes a score of each of predetermined intents, and the adjusting of the intent classification result includes adjusting the score of each of the predetermined intents based on the utterance history information of the user, and
wherein the user terminal outputs to the outside, a content signal or a system utterance corresponding to the system response through at least one of a speaker or a display.

2. The dialogue processing method of claim 1, wherein the adjusting of the intent classification result further includes adjusting an intent with a higher frequency of use by the user through the voice command to have a higher score, among the predetermined intents.

3. The dialogue processing method of claim 1, wherein the adjusting of the intent classification result further includes redetermining the score by assigning a high weight to a score of an intent with a high frequency of use by the user through utterance of the voice command, among the predetermined intents.

4. The dialogue processing method of claim 1, wherein the adjusting of the intent classification result further includes decreasing a score which is less than a threshold and increasing a score of an intent with a high frequency of use by the user through utterance of the voice command, among the scores of the predetermined intents.

5. The dialogue processing method of claim 4, wherein an amount of the decreasing in the score which is less than the threshold and an amount of the increasing in the score of the intent with the high frequency of use by the user through utterance of the voice command are proportional to each other.

6. The dialogue processing method of claim 1, wherein the utterance history information of the user further includes at least one of information on an utterance time of the user's voice command or an utterance location of the user's voice command.

7. The dialogue processing method of claim 6, wherein the adjusting of the intent classification result further includes redetermining the scores by assigning a high weight to a score of an intent with a high frequency of use at the utterance time or in the utterance location matching a current utterance time or a current utterance location, among the predetermined intents.

8. The dialogue processing method of claim 1, wherein the adjusting of the intent classification result further includes determining an intent including a highest score among the adjusted scores to be a final intent for the voice command of the user, and performing slot tagging on the voice command of the user based on the final intent.

9. A computer-readable non-transitory recording medium storing a program for executing a dialogue processing method is recorded, the dialogue processing method comprising:
obtaining an intent classification result for a voice command of a user using a trained intent classification model;
obtaining utterance history information of the user;
adjusting the intent classification result based on the obtained utterance history information of the user;
generating a system response based on the adjusted intent classification result; and
transmitting the generated system response to a user terminal;
wherein the utterance history information of the user includes information on a frequency of an intent used by the user through utterance of the voice command,
wherein the intent classification result includes a score of each of predetermined intents, and
the adjusting of the intent classification result includes adjusting the score of each of the predetermined intents based on the utterance history information of the user,
wherein the user terminal outputs to the outside, a content signal or a system utterance corresponding to the system response through at least one of a speaker or a display.

10. The computer-readable non-transitory recording medium of claim 9, wherein the adjusting of the intent classification result further includes adjusting an intent with a higher frequency of use by the user through the voice command to have a higher score, among the predetermined intents.

11. The computer-readable non-transitory recording medium of claim 9, wherein the adjusting of the intent classification result further includes redetermining the score by assigning a high weight to a score of an intent with a high frequency of use by the user through utterance of the voice command, among the predetermined intents.

12. The computer-readable non-transitory recording medium of claim 9, wherein the adjusting of the intent classification result further includes decreasing a score which is less than a threshold and increasing a score of an intent with a high frequency of use by the user through utterance of the voice command, among the scores of the predetermined intents.

13. The computer-readable non-transitory recording medium of claim 12, wherein an amount of the decreasing in the score which is less than the threshold and an amount of the increasing in the score of the intent with the high frequency of use by the user through utterance of the voice command are proportional to each other.

14. The computer-readable non-transitory recording medium of claim 9, wherein the utterance history information of the user further includes at least one of information on an utterance time of the user's voice command or an utterance location of the user's voice command.

15. The computer-readable non-transitory recording medium of claim 14, wherein the adjusting of the intent classification result further includes redetermining the scores by assigning a high weight to a score of an intent with a high frequency of use at the utterance time or in the utterance location matching a current utterance time or a current utterance location, among the predetermined intents.

16. The computer-readable non-transitory recording medium of claim 9, wherein the adjusting of the intent classification result further includes determining an intent including a highest score among the adjusted scores to be a final intent for the voice command of the user, and performing slot tagging on the voice command of the user based on the final intent.

* * * * *